United States Patent
Marupaduga

(10) Patent No.: US 11,277,875 B1
(45) Date of Patent: *Mar. 15, 2022

(54) COOPERATIVE USE OF COVERAGE STRENGTH AND INSERTION LOSS AS A BASIS TO CONTROL WHETHER TO ESTABLISH DUAL CONNECTIVITY FOR A UE

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/949,210

(22) Filed: Oct. 20, 2020

(51) Int. Cl.
*H04W 24/10* (2009.01)
*H04W 76/15* (2018.01)
*H04B 17/318* (2015.01)
*H04W 92/10* (2009.01)

(52) U.S. Cl.
CPC .......... *H04W 76/15* (2018.02); *H04B 17/318* (2015.01); *H04W 24/10* (2013.01); *H04W 92/10* (2013.01)

(58) Field of Classification Search
CPC ..... H04W 36/22; H04W 88/06; H04W 24/10; H04W 36/28; H04W 24/08; H04W 76/15; H04W 36/0069; H04W 92/10; H04B 17/318
See application file for complete search history.

(56) References Cited

U.S. PATENT DOCUMENTS

| | | |
|---|---|---|
| 9,999,052 B1 * | 6/2018 | Marupaduga ..... H04W 72/0406 |
| 10,582,501 B1 | 3/2020 | Marupaduga et al. |
| 2013/0028147 A1 | 1/2013 | Black |
| 2013/0273860 A1 | 10/2013 | Pehlke |
| 2014/0233386 A1 * | 8/2014 | Jamadagni ............ H04W 36/22 370/235 |
| 2017/0026074 A1 | 1/2017 | King et al. |
| 2017/0063404 A1 | 3/2017 | Langer et al. |
| 2018/0123562 A1 | 5/2018 | Bradley |
| 2018/0189426 A1 | 7/2018 | Turner et al. |
| 2019/0173543 A1 | 6/2019 | Ganesan et al. |
| 2021/0195439 A1 * | 6/2021 | Prabhakar ............ H04B 7/0805 |

* cited by examiner

*Primary Examiner* — Chuong A Ngo

(57) ABSTRACT

A method and system for controlling whether to establish dual connectivity for a user equipment device (UE) when the UE has a primary connection with a first access node, where establishing the dual connectivity includes adding for the UE a secondary connection with a second access node on a carrier. An example method includes, when coverage strength of the UE from the second access node on the carrier is high enough to trigger establishing the dual connectivity, (a) making a determination of whether both (i) the coverage strength of the UE from the second access node on the carrier is threshold low and (ii) insertion loss of the carrier at the second access node threshold high and (b) using the determination as a basis to control whether to establish the dual connectivity for the UE.

20 Claims, 4 Drawing Sheets

WHEN A UE HAS A PRIMARY CONNECTION WITH A FIRST ACCESS NODE AND HAS COVERAGE STRENGTH FROM A SECOND ACCESS NODE THAT IS AT LEAST AS HIGH AS A FIRST PREDEFINED THRESHOLD FOR TRIGGERING DUAL CONNECTIVITY INCLUDING ADDING FOR THE UE A SECONDARY CONNECTION WITH THE SECOND ACCESS NODE ON THE CARRIER, MAKE A DETERMINATION OF WHETHER BOTH (i) COVERAGE STRENGTH OF THE UE FROM THE SECOND ACCESS NODE ON THE CARRIER IS AT LEAST AS LOW AS A SECOND PREDEFINED COVERAGE STRENGTH THRESHOLD THAT IS HIGHER THAN THE FIRST PREDEFINED COVERAGE STRENGTH THRESHOLD AND (ii) INSERTION LOSS OF THE CARRIER AT THE SECOND ACCESS NODE IS AT LEAST AS HIGH AS A PREDEFINED INSERTION-LOSS THRESHOLDL CONNECTIVITY WITH A FIRST ACCESS NODE AND A SECOND ACCESS NODE, DETERMINE THAT POWER HEADROOM OF THE UE ON AN AIR-INTERFACE CONNECTION BETWEEN THE UE AND THE SECOND ACCESS NODE IS THRESHOLD LOW

USE THE DETERMINATION AS A BASIS TO CONTROL WHETHER TO ESTABLISH THE DUAL CONNECTIVITY FOR THE UE

WHEN A UE HAS A PRIMARY CONNECTION WITH A FIRST ACCESS NODE AND HAS COVERAGE STRENGTH FROM A SECOND ACCESS NODE THAT IS AT LEAST AS HIGH AS A FIRST PREDEFINED THRESHOLD FOR TRIGGERING DUAL CONNECTIVITY INCLUDING ADDING FOR THE UE A SECONDARY CONNECTION WITH THE SECOND ACCESS NODE ON THE CARRIER, MAKE A DETERMINATION OF WHETHER BOTH (i) COVERAGE STRENGTH OF THE UE FROM THE SECOND ACCESS NODE ON THE CARRIER IS AT LEAST AS LOW AS A SECOND PREDEFINED COVERAGE STRENGTH THRESHOLD THAT IS HIGHER THAN THE FIRST PREDEFINED COVERAGE STRENGTH THRESHOLD AND (ii) INSERTION LOSS OF THE CARRIER AT THE SECOND ACCESS NODE IS AT LEAST AS HIGH AS A PREDEFINED INSERTION-LOSS THRESHOLDL CONNECTIVITY WITH A FIRST ACCESS NODE AND A SECOND ACCESS NODE, DETERMINE THAT POWER HEADROOM OF THE UE ON AN AIR-INTERFACE CONNECTION BETWEEN THE UE AND THE SECOND ACCESS NODE IS THRESHOLD LOW ~38

USE THE DETERMINATION AS A BASIS TO CONTROL WHETHER TO ESTABLISH THE DUAL CONNECTIVITY FOR THE UE
40

Fig. 2

COOPERATIVE USE OF COVERAGE STRENGTH AND INSERTION LOSS AS A BASIS TO CONTROL WHETHER TO ESTABLISH DUAL CONNECTIVITY FOR A UE

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth (width in frequency) and a center frequency and thus extending from a low-end frequency to a high-end frequency.

Further each carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities.

On the downlink and uplink, the air interface provided by an access node on a given carrier could be configured in a specific manner to define physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry reference signals or the like that UEs could measure in order to determine coverage strength, and other resource elements could be reserved to carry other control signaling such as PRB-scheduling directives and acknowledgement messaging from the access node to UEs. And on the uplink, certain resource elements could be reserved to carry random-access signaling from UEs to the access node, and other resource elements could be reserved to carry other control signaling such as PRB-scheduling requests, acknowledgement messaging, and channel-quality reports from UEs to the access node.

OVERVIEW

When a UE enters into coverage of such a system, the UE could detect threshold strong coverage of an access node on a carrier (e.g., a threshold strong reference signal broadcast by the access node on that carrier) and could then engage in random-access and connection signaling with the access node to establish an air-interface connection, such as a Radio Resource Control (RRC) connection, through which the access node will then serve the UE on the carrier.

Further, if the UE is not already registered for service with the core network, the UE could transmit to the access node an attach request, which the access node could forward to a core-network controller for processing. And the core-network controller and access node could then coordinate setup for the UE of one or more user-plane bearers, each including an access-bearer portion that extends between the access node and a core-network gateway (e.g. user plane function) that provides connectivity with a transport network and a data-radio-bearer (DRB) portion that extends over the air between the access node and the UE.

Once the UE is so connected and registered, the access node could then serve the UE over the air-interface connection, managing downlink air-interface communication of data to the UE and uplink air-interface communication of data from the UE.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in a control region of that subframe a Downlink Control Information (DCI) message that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI message that designates those upcoming PRBs. And the UE could then accordingly transmit the transport block to the access node in the designated PRBs.

For each such transmission on the downlink and the uplink, the receiving end (i.e., the UE or the access node) could determine whether it received the transport block successfully from the transmitting end (i.e., the access node or the UE). For instance, the transmission could carry a cyclic redundancy check (CRC) value computed based on the transport block, and the receiving end could compute a CRC based on the received transport block and determine whether its computed CRC matches that carried by the transmission. If the receiving end receives the transmission and determines that the CRC matches, then the receiving end could transmit to the transmitting end a positive acknowledgement (ACK) control message. Whereas, if the receiving end does not receive the transmission or determines that the CRC does not match and thus that there was an error in the received transport block, then the receiving end could transmit to the transmitting end a negative acknowledgement (NACK), in response to which the transmitting end could then attempt retransmission.

In addition, when an access node serves a UE, the access node and UE may also support various additional services that my help provide the UE with increased peak data rate and improved quality of communications. Without limitation, an example of such service is dual connectivity service, where a UE is served concurrently on multiple air-interface connections.

Dual-connectivity service can be especially useful and desirable as the industry advances from one RAT to another, as dual-connectivity in that scenario could involve a UE being served concurrently on a connection according to a legacy RAT and a connection according to a newer and possibly technically-superior RAT. For instance, as the industry advances from 4G LTE to 5G NR, 4G-5G dual-connectivity service such as to as EUTRA-NR Dual Connectivity (EN-DC) may allow the UE to operate concurrently with both a legacy 4G LTE connection and a possibly higher throughput 5G NR connection. Such dual-connectivity service, or "non-standalone" (NSA) service, could be distinguished from standalone (SA) service, where the UE has just a single connection or is connected and served according to just a single RAT, such as just 4G LTE or just 5G NR.

In an example dual-connectivity implementation, the UE would have at least two separate and co-existing air-interface connections, including a primary connection with a first access node that functions as the UE's master node (MN) and a secondary connection with a second access node that functions as a secondary node (SN) to provide the UE with added bandwidth for user-plane communications. In particular, the access node with which the UE initially connects as noted above could function as the UE's MN and, as such, could be the anchor point for both key RRC signaling and core-network control signaling for service of the UE and could also be responsible for coordinating setup, management, and teardown of dual connectivity for the UE.

Once the UE has established its primary connection with an access node as noted above and has attached with the core network, and perhaps having determined from profile data that the UE is dual-connectivity-capable, the UE's serving access node, acting as an MN, could then engage in a process to establish dual connectivity for the UE, so that the UE can be served currently by the MN and the SN.

Setting up dual connectivity in an example implementation could involve a series of steps.

First, the MN could direct the UE to scan for secondary coverage, such as by transmitting to the UE a measurement object that specifies one or more SN carriers and that specifies for each such carrier a reference signal receive power (RSRP) threshold. In a dual-RAT arrangement such as for EN-DC, this could be a "B1" (inter-RAT) measurement object. And the UE then scans and discovers threshold strong coverage on such a carrier, the UE could transmit to the MN a measurement report (e.g., a B1 measurement report) identifying the SN, the carrier, and the threshold strong measured RSRP.

Given this measurement report indicating that the UE is within threshold strong coverage of a given SN on a given carrier, the MN could then engage in an SN-addition process to add for the UE a secondary connection with the SN on that carrier, so that the MN and SN can then cooperatively provide the UE with dual-connectivity service over their respective connections with the UE. For instance, the MN could transmit to the SN an SN-addition request message, providing RRC and DRB configuration information and other information for the secondary connection on the carrier, and the SN could then responsively allocate resources for the secondary connection on that carrier and could reply to the MN with an SN-addition-request acknowledge message. The MN could then transmit to the UE an RRC connection-reconfiguration message providing the UE with parameters of the secondary connection on the carrier. And the UE could respond to the MN with a reconfiguration-complete message, which the MN could forward to the SN. Further, the UE could then engage in random-access signaling with the SN so as to complete establishment of the secondary connection for the UE.

In addition, for some dual-connectivity implementations, the MN could also engage in a process to transfer the UE's access bearer from being between the core-network gateway and the MN to instead being between the core-network gateway and the SN. For instance, the MN could include in its SN-addition request to the SN information about the access bearer, and the MN could transmit to the core-network controller an access-bearer modification request and the core-network controller could coordinate transfer of the access-bearer from the MN to the SN.

With dual connectivity so configured by way of example, the MN and SN could then serve the UE with packet-data communications over their respective connections with the UE, with each access node coordinating air-interface communication in the manner described above. For instance, downlink data could flow over the UE's access bearer from the gateway system to the SN, the SN could transmit a portion of the data over the UE's secondary connection to the UE, and the SN could send another portion of the data to the MN, which the MN could transmit over the UE's primary connection to the UE. Likewise, when the UE has data to transmit, the UE could transmit a portion of the data over the UE's primary connection to the MN, which the MN could forward to the SN and the SN could transmit over the UE's access bearer to gateway system, and the UE could transmit another portion of the data over the UE's secondary connection to the SN, which the SN could transmit over the UE's access bearer to the gateway system.

In general, dual connectivity could be especially beneficial for a UE, facilitating increased peak data rate of communications by multiplexing the UE's communications across the multiple air-interface connections.

Unfortunately, however, in certain situations, providing a UE with dual connectivity service may actually be inefficient and undesirable. One such situation is where communication quality on the UE's added secondary connection with the SN would be poor—even though the UE may have reported being within threshold strong enough coverage of the SN (e.g., per a B1 measurement report) to justify adding the connection.

In general, if communication quality on the UE's secondary connection is poor, there could be a high likelihood of transport-block errors on that connection, which could in turn lead to a high rate of NACKs and retransmissions as noted above. And a high rate of retransmissions could be counterproductive, potentially slowing down the UE's communications. If that is going to be situation, then it may actually be better for the UE to be served with standalone connectivity by the MN, rather than having the MN establish the dual connectivity for the UE.

At least two factors could combine with each other to cooperatively result in poor communication quality on the UE's secondary connection with the SN: (1) weak coverage strength from the SN, and (2) high insertion loss at the SN. Further, both of these factors could be specific to the carrier on which the UE's secondary connection would be established.

The UE having relatively weak coverage strength from the SN on that carrier could correspond with the UE having relatively poor communication quality both on the downlink and uplink on that carrier. For instance, weak coverage on the downlink could give rise to a high block error rate with NACKs and associated retransmissions for downlink communication, and that weak coverage may also correspond with an even higher block error rate with NACKs and associated retransmissions for uplink communication. Further, this could be the case even if the UE's reported RSRP on the carrier meets the RSRP measurement threshold for adding secondary connectivity on the carrier. For instance, the UE's RSRP on the carrier may still be relatively weak, possibly just borderline strong enough. So the weak coverage, particularly with any downward variation, could be problematic.

Insertion loss as to the carrier is, in turn, a loss in signal power resulting from the insertion of one or more devices in a transmission line or circuitry serving communication on the carrier. In operation, for instance, the SN could be configured with one or more RF filters, combiners, diplexers, triplexers, antenna ports, antennas, jumper cables, and other components that may cooperatively introduce signal loss of communications on the carrier. Further, if the SN is configured to provide service on multiple carriers, these components may introduce different levels of insertion loss as to different carriers, and/or different subsets of components may handle communications for different carriers and introduce different levels of insertion loss than each other.

This insertion loss as to a carrier, combined with relatively weak coverage strength on the carrier, could be especially problematic, possibly exacerbating the block error rate issue noted above and causing associated issues.

The present disclosure provides a mechanism to help address this issue. In accordance with the disclosure, when a UE has a primary connection with an MN and the MN is faced with the choice of whether to establish dual connectivity for the UE by adding for the UE a secondary connection with an SN on a particular carrier, the MN will evaluate a combination of the UE's coverage strength from the SN on that carrier and the insertion loss of that carrier at the SN and will use that evaluation as a basis to decide whether to establish the dual connectivity for the UE.

In particular, the MN could make a determination of whether both (i) the UE's coverage strength of the SN on the carrier is at least as low as a predefined threshold low coverage strength and (ii) the insertion loss of the carrier at the SN is at least as high a predefined threshold high insertion loss. And this determination integrally combines together these two aspects for the reason noted above. If the determination is negative (e.g., if either or both of the factors are not met), then, based at least in part on the determination, the MN could then proceed with establishing the dual connectivity. Whereas, if the determination is affirmative, then, based at least in part on the determination, the MN could forgo establishing the dual connectivity.

Phrased another way, the MN could make a determination that both (i) the UE's coverage strength of the SN on the carrier is at least as low as a predefined threshold low coverage strength and (ii) the insertion loss of the carrier at the SN is at least as high a predefined threshold high insertion loss. And responsive to making that determination (i.e., as a direct result of making that determination, rather than merely following in order after making that determination), the MN could forgo establishing the dual connectivity.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 2 is a flow chart depicting an example method in accordance with the disclosure.

DETAILED DESCRIPTION

An example implementation will now be described in the context of 4G LTE, 5G NR, and 4G-5G dual connectivity, referred to as noted above as EN-DC. With EN-DC, a 4G LTE access node (e.g., 4G evolved Node-B (eNB)) functions as the MN, and a 5G NR access node (e.g., 5G next-generation Node-B (gNB)) functions as the SN. Thus, a UE could first establish a standalone 4G connection with a 4G eNB, and the 4G eNB could then coordinate establishment of EN-DC for the UE, including determining that the UE is with threshold strong enough coverage of the 5G gNB on a given carrier and coordinating setup for the UE of a secondary 5G connection with the 5G gNB on that carrier. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations, including possibly a single-RAT dual-connectivity arrangement. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations.

Figure 1:
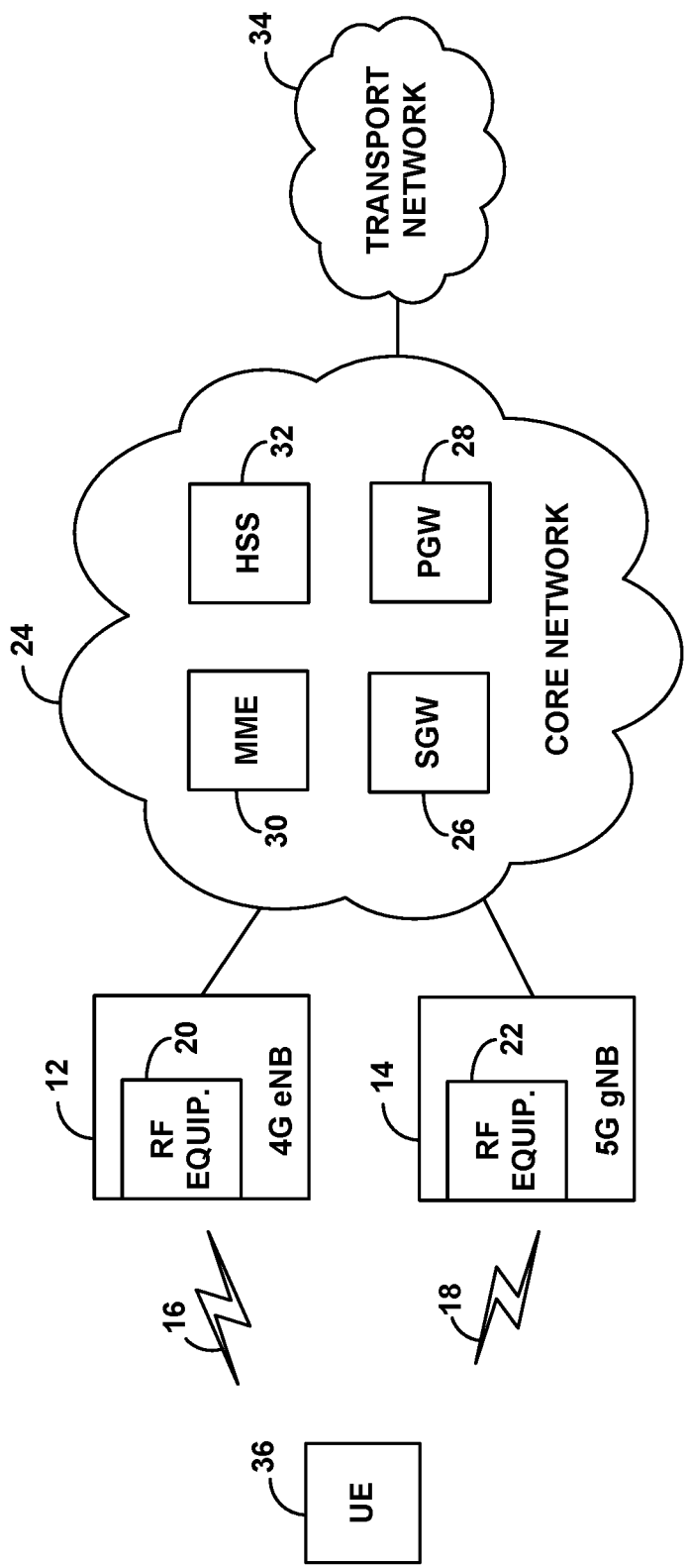
FIG. 1 is a simplified block diagram of an example network arrangement in which features of the present disclosure can be implemented.

Referring to the drawings, FIG. 1 is a simplified block diagram of an example network arrangement having a 4G eNB 12 and a 5G gNB 14. These access nodes could be macro access nodes of the type configured to provide a wide range of coverage or could take other forms, such as small cell access nodes, relays, femtocell access nodes, or the like, possibly configured to provide a smaller range of coverage. Further, the access nodes could be collocated with each other, e.g., at a common cell site with collocated RF points of origin, or could be separately located. Either way, the access nodes could be optimally configured to provide overlapping coverage in order to support EN-DC service.

In the example illustrated, the 4G eNB 12 is configured to provide 4G coverage and service on at least one 4G carrier 16, and the 5G gNB 14 is configured to provide 5G coverage and service on at least one 5G carrier 18. In some implementations, the 4G carrier and 5G carrier may be different carriers—occupying different RF frequency ranges. But in some other implementations, employing dynamic spectrum sharing for instance, the 4G eNB 12 and 5G gNB might operate on the same carrier as each other or on carriers that overlap in RF spectrum with each other and may interwork with each other to coordinate their respective operation on that spectrum.

To facilitate providing service and coverage on the illustrated carriers, the access nodes could each have a respective antenna structure, such as an antenna array, that is configured to transmit and receive electromagnetic signals in a region defined by an antenna pattern or radiation pattern, or the access nodes could share portions of a common antenna array for this purpose.

Further, for each such carrier on which an access node operates, the access node might have a respective set of RF equipment, such as respective antenna elements, and respective antenna ports, jumper cables, and various other components possibly including and/or extending between a radio and the antenna elements, that the access node would use for air-interface communication on the carrier. As shown in FIG. 1, for instance, the 4G eNB 12 may have a set of RF equipment 20 for serving air-interface communications on 4G carrier 16, and the 5G gNB 14 may have a set of RF equipment 22 for serving air-interface communications on 5G carrier 18.

The air interface on each of these carriers could be structured as described above by way of example, being divided over time into frames, subframes, and symbol time segments, and over frequency into subcarriers, thus defining an array of air-interface resource elements grouped into PRBs allocable by the respective access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

In the example arrangement of FIG. 1, the 4G eNB 12 and 5G gNB 14 are both interfaced with a core network 24, which could be a packet-switched network such as an Evolved Packet Core (EPC) network (e.g., 4G core) or Next Generation Core (NGC) network (e.g., 5G core), among other possibilities. As shown, for instance, the core network 24 could be an EPC network including a serving gateway (SGW) 26, a packet data network gateway (PGW) 28, a mobility management entity (MME) 30, and a home subscriber server (HSS) 32, although other arrangements are possible as well. This arrangement could support communication between various entities through virtual packet tunnels or the like.

In an example implementation, without limitation, each access node could have an interface with the SGW 26, the SGW 26 could have an interface with the PGW 28, and the PGW 28 could provide connectivity with a transport network 34 such as the Internet. In addition, each access node could have an interface with the MME 30, and the MME 30 could have an interface with the SGW 26, so that the MME 30 could coordinate setup of bearers for UEs to enable the UEs to engage in packet-data communication via 4G and 5G. Alternatively, just the 4G eNB 12 might have an interface with the MME 30 and may function as an anchor for control signaling with the MME 30 both for 4G service and EN-DC service. Further, the access nodes could have an interface with each other, to facilitate inter-access-node signaling.

Still further, the HSS 32 could store or have access to UE profile records, which could specify service-subscription plans, UE configurations, and/or other such UE capability information, such as whether a UE is EN-DC capable for instance.

FIG. 1 also illustrates an example UE 36 within coverage of both the 4G eNB 12 and the 5G gNB 14. This UE could take any of the forms noted above among other possibilities. And the UE could be equipped with both a 4G LTE radio and a 5G NR radio and include associated circuitry and logic that enables the UE to engage in 4G LTE service, 5G NR service, and EN-DC service. Further, in line with the discussion above, the 4G eNB 12 could be configured to support providing this UE with standalone 4G service, and the 4G eNB 12 and 5G gNB 14 could be configured to support providing the UE with EN-DC service.

In an example implementation, upon entering into coverage of this network, the UE could initially scan for 4G coverage and could discover threshold strong coverage of the 4G eNB 12 on a 4G carrier 16, and the UE could then responsively engage in random access and RRC signaling with the 4G eNB 12 to establish a 4G connection between the UE and the 4G eNB 12 on that 4G carrier 20.

In addition, if the UE is not already registered with the core network 24, the UE could then also transmit to the 4G eNB 12 an attach request message, which the 4G eNB 12 could forward to the MME 30 for processing. And upon authenticating and authorizing the UE for service, the MME 30 and 4G eNB 12 could coordinate setup for the UE of at least one user-plane bearer. For instance, the MME 30 could engage in signaling with the 4G eNB 12 and the SGW 26 to coordinate setup for the UE of an S1-U packet tunnel between the 4G eNB 12 and the SGW 26, and the SGW 26 could responsively engage in signaling with the PGW 28 to coordinate setup for the UE of an associated S5 packet tunnel between the SGW 26 and the PGW 28. Further, the 4G eNB 12 could engage in signaling with the UE to establish for the UE an associated DRB.

Once the UE is connected with the 4G eNB 12 and registered with the 4G core network 20, the 4G eNB 12 could then serve the UE with wireless packet-data communications as noted above in a standalone-4G mode. For instance, when the PGW 28 receives data on the transport network 24 for transmission to the UE, that data could flow via the UE's access bearer to the 4G eNB 12, and the 4G eNB 12 could coordinate transmission of that data from the 4G eNB 12 to the UE on downlink PRBs of the 4G carrier 16 of the UE's 4G connection. And when the UE has data for transmission on the transport network 24, the UE could transmit a scheduling request to the 4G eNB 12, the 4G eNB 12 could coordinate transmission of that data from the UE to the 4G eNB 12 on uplink PRBs of the 4G carrier 16, and the data could then flow via the UE's access bearer to the PGW 28, for output on the transport network 18.

In addition, in relation to the UE's connection and/or attachment process or at another time, the 4G eNB 12 could also obtain capabilities data regarding the UE and could store the capabilities data in the UE context record for reference while serving the UE. For instance, during the attachment process, the MME 30 could obtain this data from the HSS 32 and could convey the data to the 4G eNB 12 for storage. Alternatively or additionally, the 4G eNB 12 could transmit to the UE an RRC message carrying a UE-capability enquiry, and the UE could respond to the 4G eNB 12 with a "UE capability information" information element (IE) specifying UE capabilities data. And this capabilities data could indicate that the UE supports EN-DC.

As the example UE supports EN-DC, the 4G eNB 12, operating as MN, could then work to configure EN-DC service for the UE.

As in the process discussed above, for instance, the 4G eNB 12 could first identify the 5G gNB 14 and 5G carrier 18 on which to establish a secondary 5G connection for the UE. For instance, the 4G eNB 12 could transmit to the UE an RRC message carrying a B1 measurement object that directs the UE to scan for 5G coverage on one or more particular carriers and that specifies an RSRP measurement threshold respectively per carrier. The UE could then responsively scan for coverage on each such indicted carrier and find that the UE's RSRP from 5G gNB 14 on 5G carrier 18 is at least as strong as the respectively specified RSRP threshold, and the UE may therefore transmit to the 4G eNB 12 an RRC message carrying a B1 measurement report that notes the 5G gNB 14, the 5G carrier 18, and the UE's RSRP on that carrier.

On grounds that the UE is thus within threshold strong coverage of the 5G gNB 14 on 5G carrier 18, the 4G eNB 12 could then engage in signaling to establish EN-DC for the UE so that the UE can be served concurrently by the 4G eNB 12 and the 5G gNB 14.

In line with the discussion above, for instance, the 4G eNB 12, operating as MN, could first engage in process to add for the UE a 5G connection with the 5G gNB 14 on the 5G carrier 18, such as by transmitting to the 5G gNB 14 an SN-Addition request to cause the 5G gNB 14 to allocate resources for that 5G connection, receiving an SN-Addition-Request acknowledge message from the 5G gNB 14, and engaging in associated RRC signaling with the UE, in response to which the UE could then access and complete establishment of the 5G connection with the 5G gNB 14. Further, to help offload some processing from the 4G eNB 12 and to take advantage of possibly higher throughput offered by the 5G connection as compared with the 4G connection, the 4G eNB 12 could engage in signaling to transfer to the UE's access bearer (e.g., S1-U tunnel) to the 5G gNB 14 as well and to coordinate setup for the UE of a split bearer to enable the UE's data communication to be split between the 4G eNB 12 and 5G gNB 14.

With EN-DC service so set up, the 4G eNB 12 and 5G gNB 14 could then concurrently serve the UE over their respective connections with the UE, with the UE's data flow being split between the UE's 4G and 5G connections.

For instance, when the PGW 28 receives data on the transport network 24 for transmission to the UE, that data could flow via the UE's access bearer to the 5G gNB 14, the 5G gNB 14 could split that data into first and second portions and (i) could send the first portion to the 4G eNB 12 for transmission by the 4G eNB 12 over the UE's 4G connection to the UE and (ii) could itself transmit the second portion over the UE's 5G connection to the UE. And when the UE has data for transmission on the transport network 24, the UE could split that data into first and second portions and (i) could send the first portion over the UE's 4G connection to the 4G eNB 12, which the 4G eNB 12 could then pass to the 5G gNB 14, from where the data could flow over the UE's access bearer for output on the transport network 24 and (ii) could send the second portion over the UE's 5G connection to the 5G gNB 14, from where that data as well could flow over the UE's access bearer for output on the transport network 24.

In line with the discussion above, although EN-DC could generally help to facilitate increased peak data rate, providing a UE with EN-DC service may be undesirable in a situation where communication quality on the UE's added 5G connection on the 5G carrier 18 would be poor—as poor communication quality may result in a relatively high block error rate and associated NACKs and retransmissions, which could be counterproductive. Further, as discussed above, factors that could cooperatively cause this problem are (i) the UE having relatively weak coverage from the 5G gNB 14 on the 5G carrier 18, even if the UE's reported coverage meets the B1 measurement threshold, and (ii) the insertion loss of the 5G carrier 18 at the 5G gNB 14 being relatively high.

Accordingly, in this context, the present disclosure provides for controlling whether the 4G eNB 12 will establish EN-DC for the UE in the first place, with the controlling being based on a cooperative consideration of at least these two factors. In particular, the disclosure provides for this control being based specifically on whether or not at least the combination of these two factors is met—as the factors in combination could give rise to the issue even though neither factor alone may give rise to the issue. Further, this process could be carried out by the 4G eNB 12 itself and/or by one or more other entities that interwork with and/or control operation of the 4G eNB 12.

In an example implementation, the 4G eNB 12 could carry out this process at the time the 4G eNB 12 receives from the UE a B1 measurement report specifying the UE's RSRP from the 5G gNB 14 on the 5G carrier 18, where that RSRP satisfies a B1 measurement threshold and is thus deemed to be strong enough to justify adding for the UE a secondary 5G connection with the 5G gNB 14 on the 5G carrier 18. At that time, the 4G eNB 12 could then further determine whether a combination of the UE's reported RSRP from the 5G gNB 14 on the 5G carrier 18 and the insertion loss of that 5G carrier at the 5G gNB 14 would be problematic enough to justify forgoing establishing of the EN-DC, and the 4G eNB 12 could operate accordingly.

To facilitate this analysis, the 4G eNB 12 could be provisioned in advance with a specification of the insertion loss of 5G carrier 18 at 5G gNB 14 or could otherwise have access to that information. Engineering personnel and/or an automated system could measure this insertion loss at the time the 5G eNB 14 is deployed or configured to operate on 5G carrier 18 and could update the measurement from time to time. The measured insertion loss could then be recorded in a profile record at the 5G gNB 14 and shared in neighbor list data or the like for storage at and/or reference by 4G eNB 12.

As noted above, at issue could be whether both (i) the UE's reported RSRP from the 5G gNB 14 on the 5G carrier 18 is at least as low as a predefined threshold low RSRP value and (ii) the insertion loss of the 5G carrier 18 at the 5G gNB 14 is at least as high as a predefined threshold high insertion-loss value.

These RSRP and insertion-loss thresholds could be set by engineering design to facilitate the present process. The RSRP threshold for this purpose might be set by relation to the B1 measurement threshold as to 5G carrier 18, such as to a value that is very close to but higher than that B1 measurement threshold. Without limitation, for instance, if the B1 measurement threshold for 5G carrier is −116 dBm, the RSRP threshold for present purposes could be −115 dBm. Further, insertion loss may range from −0.25 dB to −0.65 dB, so a reasonable threshold high insertion loss value could be around −0.5 dB.

Thus, the 4G eNB 12 could compare the UE's reported RSRP from 5G gNB 14 on 5G carrier 18 with the RSRP threshold set for the present purpose to determine if the UE's reported RSRP is threshold low, and the 4G eNB 12 could compare the insertion loss of the 5G carrier 18 at the 5G gNB 14 with the insertion-loss threshold to determine if the insertion loss of the 5G carrier at the 5G gNB 14 is threshold high.

If the 4G eNB 12 thereby determines that both the UE's reported RSRP from the 5G eNB 14 on the 5G carrier 18 is threshold low and the insertion loss of the 5G carrier 18 at the 5G gNB 14 is threshold high, then, based at least on that determination, the 4G eNB 12 could forgo establishing the EN-DC for the UE. Whereas, if the 4G eNB 12 determines that at least one of these two factors is not met, then, based at least on that determination, the 4G eNB 12 could proceed with establishing the EN-DC for the UE.

Note also or alternatively that at issue could be whether the aggregate of the UE's reported RSRP from the 5G gNB 14 on the 5G carrier 18 and the insertion loss of the 5G carrier 18 at the 5G gNB 14 is at least as low as a predefined total threshold level, accounting for conversion between units in dB and units in dBm. Thus, if the 4G eNB 12 determines that that aggregate is at least as low as a predefined threshold level that is deemed to be problematic, then, based at least on that determination, the 4G eNB 12 could forgo establishing the EN-DC for the UE. Whereas, if the 4G eNB 12 determines that the aggregate is not at least as low as that predefined threshold level, then, based at least on that determination, the 4G eNB 12 could proceed with establishing the EN-DC for the UE.

Establishing the EN-DC for the UE could involve engaging in the SN-addition process as discussed above to at least add for the UE a secondary 5G connection with the 5G gNB 14 on the 5G carrier 18, so that the 4G eNB 12 and 5G gNB could then concurrently serve the UE on their respective connections with the UE. And forgoing establishing of the EN-DC for the UE could involve forgoing engaging in the SN-addition to add that secondary 5G connection for the UE. Forgoing establishing of the EN-DC for the UE could thus mean that the 4G eNB 12 would instead simply serve the UE with standalone 4G connectivity. Or forgoing establishing of the EN-DC for the UE could involve the 4G eNB 12 instead possibly setting up EN-DC for the UE using a different 5G gNB or different 5G carrier that would not pose the present issue.

FIG. 2 is a flow chart depicting a method that could be carried out in accordance with the present disclosure to control whether to establish dual connectivity for a UE when the UE has a primary air-interface connection with a first access node, where establishing the dual connectivity includes adding for the UE a secondary air-interface connection with a second access node on a carrier. As noted above, this method could be carried out when (e.g., responsive to determining that) coverage strength of the UE from the second access node on the carrier is at least as high as a first predefined coverage strength threshold (e.g., a B1 measurement threshold) for triggering establishing of the dual connectivity. Further, the method could be carried out by the first access node and/or by one or more other entities.

As shown in FIG. 2, at block 38, the method includes making a determination of whether both (i) the coverage strength of the UE from the second access node on the carrier is at least as low as a second predefined coverage strength threshold that is higher than the first predefined coverage strength threshold and (ii) insertion loss of the carrier at the second access node is at least as high as a predefined insertion-loss threshold. And at block 40, the method includes using the determination as a basis to control whether to establish the dual connectivity for the UE.

In line with the discussion above, the act of using the determination as a basis to control whether to establish the dual connectivity for the UE could involve (i) if the determination is affirmative, then, based at least on the determination, forgoing establishing of the dual connectivity for the UE, and (ii) if the determination is negative, then, based at least on the determination, proceeding with establishing of the dual connectivity for the UE.

Further, as discussed above, the act of using the determination as a basis to control whether to establish the dual connectivity for the UE could involve, responsive to at least the determination being that both the coverage strength of the UE from the second access node on the carrier is at least as low as the second predefined coverage strength threshold and the insertion loss of the carrier at the second access node is at least as high as the predefined insertion-loss threshold, forgoing establishing of the dual connectivity for the UE.

And as discussed above, the act of forgoing establishing of the dual connectivity for the UE could involve, instead of establishing the dual connectivity for the UE, the first access node providing the UE with standalone connectivity. Or the act of forgoing establishing of the dual connectivity for the UE could involve, instead of establishing the dual connectivity for the UE including adding for the UE the secondary connection with the second access node on the carrier, establishing other dual connectivity for the UE—such as by adding for the UE secondary connectivity with another secondary access node and/or on another carrier.

Yet further, as discussed above, the first and second air-interface connections could be according to different RATs than each other. For instance, the first air-interface connection could be according to 4G LTE and the second air-interface connection could be according to 5G NR. And in that case, the dual connectivity could be EN-DC.

Figure 3:
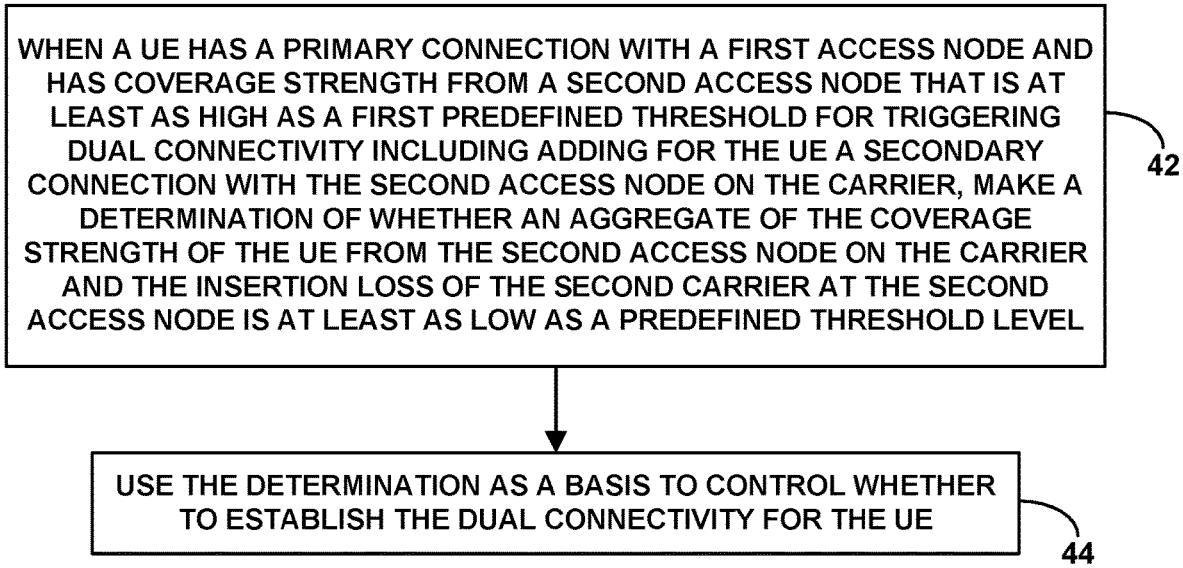
FIG. 3 is another flow chart depicting an example method in accordance with the disclosure.

FIG. 3 is next another flow chart depicting a method that could be carried out in accordance with the present disclosure to control whether to establish dual connectivity for a UE when the UE has a primary air-interface connection with a first access node in the context as discussed above. As shown in FIG. 3, at block 42, the method includes making a determination of whether an aggregate of the coverage strength of the UE from the second access node on the carrier and the insertion loss of the second carrier at the second access node is at least as low as a predefined threshold level. And at block 44, the method includes using the determination as a basis to control whether to establish the dual connectivity for the UE. Various features described elsewhere herein could also be implemented in this context as well, and vice versa.

Figure 4:
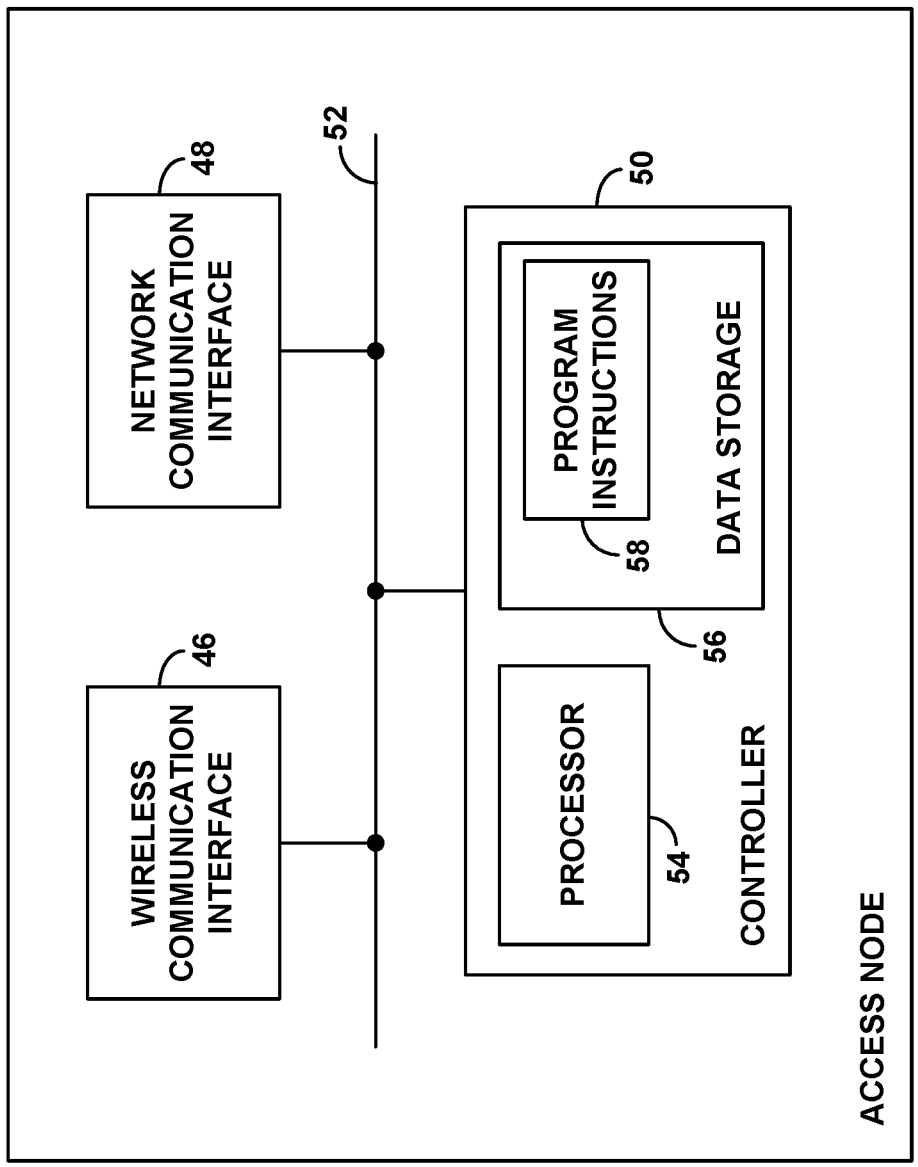
FIG. 4 is a simplified block diagram of an example access node operable in accordance with the disclosure.

Finally, FIG. 4 is a simplified block diagram of an access node, showing some of the components that could be included to facilitate carrying out various operations as described herein. This access node could represent the 4G eNB 12 discussed above, among other possibilities.

As shown, the example access node includes a wireless communication interface 46, a network communication interface 48, and a controller 50, all of which could be integrated together and/or communicatively linked together by a system bus, network, or other connection mechanism 52.

In this example arrangement, the wireless communication interface 46 could be configured to provide cellular coverage on at least one carrier according to a particular RAT, such as to serve a UE over an air-interface connection in accordance with the RAT for instance. As such, the wireless communication interface 46 could comprise an antenna structure, which could be tower mounted or could take other forms, and associated components such as a power amplifier and a wireless transceiver.

Further, the network communication interface 48 could comprise a wired or wireless interface, such as an Ethernet network communication interface and associated logic (e.g., protocol stacks), through which the access node could engage in backhaul communication, such as with other access nodes and various core-network entities.

Controller 50 could then comprise control logic to cause the first access node to carry out various operations including those discussed herein. As such, the controller 50 could take various forms, including but not limited to a processor 54 (e.g., e.g., one or more general purpose microprocessors and/or dedicated processing units) and non-transitory data storage 56 (e.g., one or more volatile and/or non-volatile storage components, such as magnetic, optical, or flash storage, necessarily non-transitory) holding, storing, encoded with, or otherwise embodying or having program instructions 58, which could be executable by the processor 54 to cause the access node to carry out various operations described herein.

Various features described herein could also be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for controlling whether to establish dual connectivity for a user equipment device (UE) when the UE has a primary air-interface connection with a first access node, wherein establishing the dual connectivity includes adding for the UE a secondary air-interface connection with a second access node on a carrier, the method comprising, when coverage strength of the UE from the second access node on the carrier is at least as high as a first predefined coverage strength threshold for triggering establishing of the dual connectivity:

making a determination of whether both (i) the coverage strength of the UE from the second access node on the carrier is at least as low as a second predefined coverage strength threshold that is higher than the first predefined coverage strength threshold and (ii) insertion loss of the carrier at the second access node is at least as high as a predefined insertion-loss threshold; and using the determination as a basis to control whether to establish the dual connectivity for the UE.

2. The method of claim 1, wherein the first predefined coverage strength threshold is a B1 measurement threshold, wherein the B1 measurement threshold is an inter-radio-access-technology (inter-RAT) coverage strength threshold.

3. The method of claim 1, wherein the method is carried out by the first access node in response to determining that the coverage strength of the UE from the second access node on the carrier is at least as high as the first predefined coverage strength threshold.

4. The method of claim 1, wherein using the determination as a basis to control whether to establish the dual connectivity for the UE comprises:

if the determination is affirmative, then, based at least on the determination, forgoing establishing of the dual connectivity for the UE; and if the determination is negative, then, based at least on the determination, proceeding with establishing of the dual connectivity for the UE.

5. The method of claim 4, wherein forgoing establishing of the dual connectivity for the UE comprises, instead of establishing the dual connectivity for the UE, the first access node providing the UE with standalone connectivity.

6. The method of claim 4, wherein forgoing establishing of the dual connectivity for the UE comprises, instead of establishing the dual connectivity for the UE including adding for the UE the secondary connection with the second access node on the carrier, establishing other dual connectivity for the UE.

7. The method of claim 1, wherein using the determination as a basis to control whether to establish the dual connectivity for the UE comprises:

responsive to at least the determination being that both the coverage strength of the UE from the second access node on the carrier is at least as low as the second predefined coverage strength threshold and the insertion loss of the carrier at the second access node is at least as high as the predefined insertion-loss threshold, forgoing establishing of the dual connectivity for the UE.

8. The method of claim 1, wherein the first air-interface connection is according to a first radio access technology (RAT) and the second air-interface connection is according to a second RAT different than the first RAT.

9. The method of claim 8, wherein the first RAT is 4G Long Term Evolution (4G LTE), the second RAT is 5G New Radio (5G NR), and the dual connectivity is EUTRA-NR Dual Connectivity (EN-DC).

10. A method for controlling whether to establish dual connectivity for a user equipment device (UE) when the UE has a primary air-interface connection with a first access node, wherein establishing the dual connectivity includes adding for the UE a secondary air-interface connection with a second access node on a carrier, the method comprising, when coverage strength of the UE from the second access node on the carrier is at least as high as a first predefined coverage strength threshold for triggering establishing of the dual connectivity:

making a determination of whether an aggregate of the coverage strength of the UE from the second access node on the carrier and the insertion loss of the second carrier at the second access node is at least as low as a predefined threshold level; and using the determination as a basis to control whether to establish the dual connectivity for the UE.

11. The method of claim 10, wherein using the determination as a basis to control whether to establish the dual connectivity for the UE comprises:

if the determination is affirmative, then, based at least on the determination, forgoing establishing of the dual connectivity for the UE; and if the determination is negative, then, based at least on the determination, proceeding with establishing of the dual connectivity for the UE.

12. The method of claim 11, wherein forgoing establishing of the dual connectivity for the UE comprises, instead of establishing the dual connectivity for the UE, providing the UE with standalone connectivity.

13. The method of claim 11, wherein forgoing establishing of the dual connectivity for the UE comprises, instead of establishing the dual connectivity for the UE including adding for the UE the secondary connection with the second access node on the carrier, establishing other dual connectivity for the UE.

14. A first access node configured to control whether to establish dual connectivity for a user equipment device (UE) when the UE has a primary air-interface connection with the first access node, wherein establishing the dual connectivity includes adding for the UE a secondary air-interface connection with a second access node on a carrier, the first access node comprising:

a wireless communication interface through which the first access node is configured to provide service on the first air-interface connection;

a network communication interface though which the first access node is configured to engage in backhaul communication; and a controller configured to cause the first access node to carry out operations when coverage strength of the UE from the second access node on the carrier is at least as high as a first predefined coverage strength threshold for triggering establishing of the dual connectivity, the operations including:

making a determination of whether both (i) the coverage strength of the UE from the second access node on the carrier is at least as low as a second predefined coverage strength threshold that is higher than the first predefined coverage strength threshold and (ii) insertion loss of the carrier at the second access node is at least as high as a predefined insertion-loss threshold, and using the determination as a basis to control whether to establish the dual connectivity for the UE.

15. The first access node of claim 14, wherein the controller comprises a processor, non-transitory data storage, and program instructions stored in the non-transitory data storage and executable by the processor to carry out the operations.

16. The first access node of claim 14, wherein the first predefined coverage strength threshold is a B1 measurement threshold, wherein the B1 measurement threshold is an inter-radio-access-technology (inter-RAT) coverage strength threshold.

17. The first access node of claim 14, wherein the controller is configured to cause the first access node to carry out the operations in response to determining that the coverage strength of the UE from the second access node on the carrier is at least as high as the first predefined coverage strength threshold.

18. The first access node of claim 14, wherein using the determination as a basis to control whether to establish the dual connectivity for the UE comprises:

if the determination is affirmative, then, based at least on the determination, forgoing establishing of the dual connectivity for the UE; and if the determination is negative, then, based at least on the determination, proceeding with establishing of the dual connectivity for the UE.

19. The first access node of claim 18, wherein forgoing establishing of the dual connectivity for the UE comprises, instead of establishing the dual connectivity for the UE, providing the UE with standalone connectivity.

20. The first access node of claim 18, wherein forgoing establishing of the dual connectivity for the UE comprises, instead of establishing the dual connectivity for the UE including adding for the UE the secondary connection with the second access node on the carrier, establishing other dual connectivity for the UE.

* * * * *